June 26, 1945. W. MILNE 2,379,243
STONE SAW
Filed Sept. 16, 1944 2 Sheets-Sheet 1
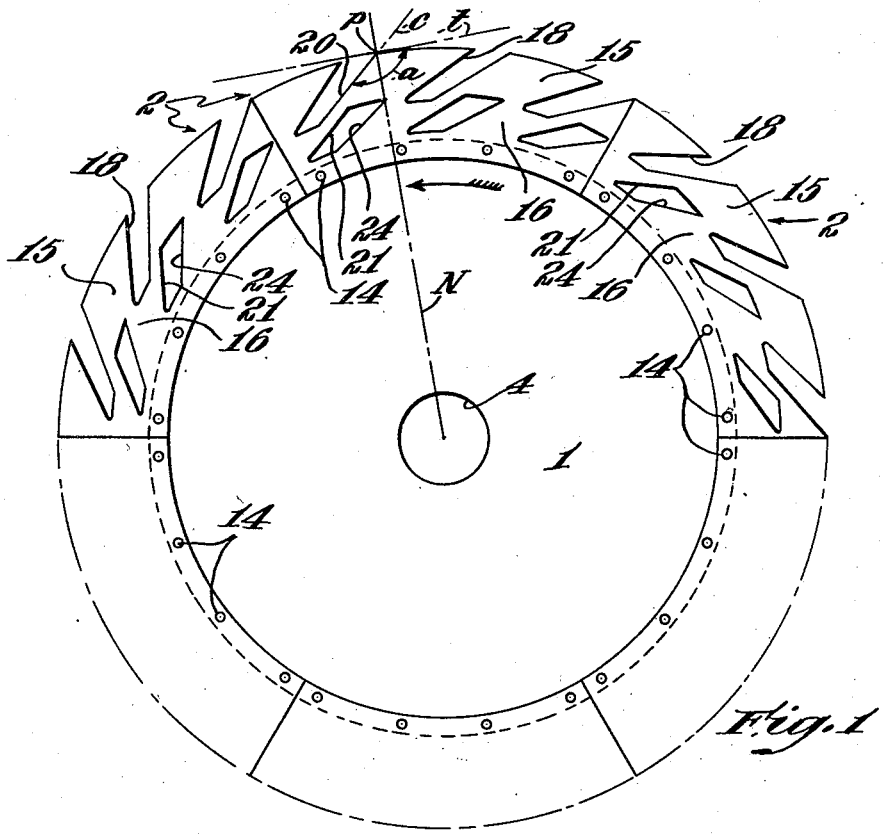
Fig. 1
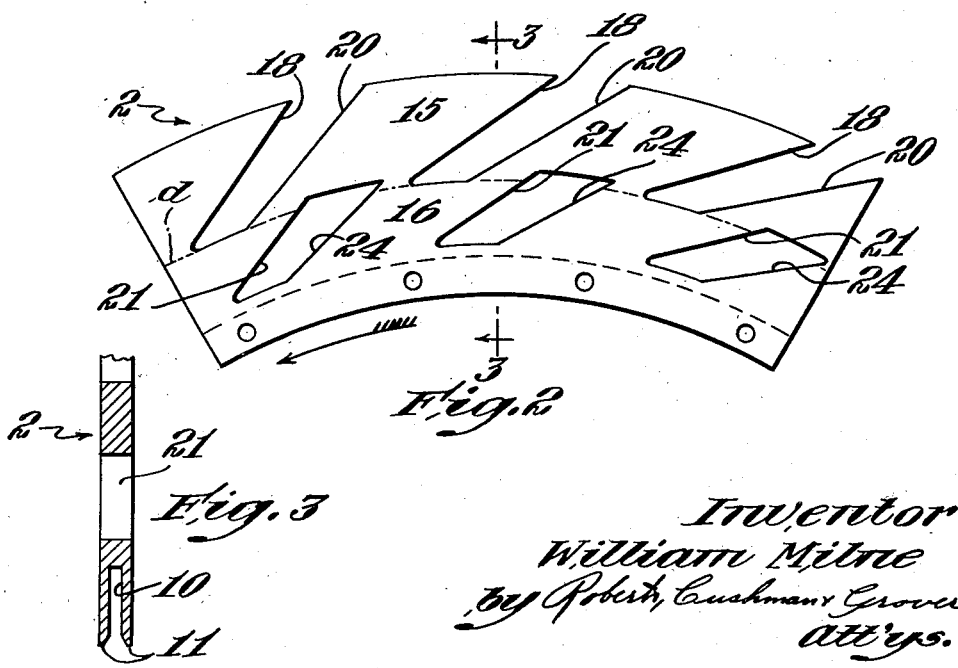
Fig. 2
Fig. 3
Inventor
William Milne
by Roberts, Cushman & Grover
Att'ys.

June 26, 1945.  W. MILNE  2,379,243

STONE SAW

Filed Sept. 16, 1944  2 Sheets-Sheet 2

Inventor
William Milne
By Roberts, Cushman & Grove
att'ys.

Patented June 26, 1945

2,379,243

UNITED STATES PATENT OFFICE 2,379,243

STONE SAW

William Milne, Barre, Vt.

Application September 16, 1944, Serial No. 554,377

2 Claims. (Cl. 125—15)

This invention relates to an improved saw blade for use in cutting stone.

In stone-cutting operations it is customary to feed steel shot through the gullets between the teeth into the kerf so that the shot works under the peripheral edges of the teeth where it is effective to reduce wear and increase the efficiency of the cutting operation. The saw teeth are usually formed on a segment-shaped piece of soft steel detachably secured to the peripheral portion of a carbon steel blade, the teeth being separated or defined by circumferentially spaced gullets which extend from the outer periphery of the segment to the inner marginal portions, and are so spaced and arranged that the leading edges of the teeth extend at an angle of the order of 125° relative to the tangent passing through the intersection of the leading edge and periphery. Although numerous variations of the foregoing have been suggested to minimize wear and increase the efficiency of the cutting operation, there are recognized limitations. For example, increasing the angle of inclination of the gullets is of advantage, but to do so would increase the length of the teeth and consequently their tendency to flex during the cutting operation, and the advantages to be derived would be more than offset by the resulting disadvantages.

Another difficulty encountered in the use of stone saws is due to the manner in which the teeth-segments are secured to the blade, it being the usual practice to form a groove on one part to receive a circumferential flange or tongue formed on the other part. The tongue usually provides annular shoulders upon which the free edges of the walls defining the groove are fitted and invariably a small gap is present between the two parts. In the cutting operation, the steel shot ultimately works into the gap with the result that the parts become badly worn, and in some cases the flange becomes worn off or broken so that the parts must be prematurely discarded. In order to compensate for this difficulty, metal is often welded to spaced areas at the junction of the parts, but this expedient is expensive and time-consuming.

The principal objects of the present invention are to overcome the aforementioned difficulties, and to provide a stone saw capable of cutting more efficiently and with substantially less wear than those heretofore available.

Further objects relate to various features of construction and will be apparent from consideration of the following description.

In accordance with the present invention my improved stone saw comprises a blade or hub portion, preferably of carbon steel and formed on its outer periphery with a flange or tongue, the base or inner wall portion of which flares outwardly, terminating in a relatively narrow annular shoulder. The teeth segments are preferably of soft steel and are mounted on the peripheral flange of the blade, the inner peripheral edge of each segment being formed with a groove having walls complementary to the flange on the blade, the edges at the mouth of the groove flaring slightly more than the outwardly flaring walls of the flange so that they may be peened or caulked against the narrow shoulder on the blade. Suitable openings for the reception of rivets or the like fastening elements are formed in the flange and grooved portions of the two parts so that they may be rigidly secured together.

The body portion of each segment comprises two annular zones of approximately the same radial dimension, the outer zone being formed with elongate slots or gullets extending in a radial direction transversely of the zone and at such an angle as to define cutting teeth having leading edges extending at an angle of at least approximately 135° relative to the tangent passing through the point of intersection of the leading edge and periphery, and the inner zone being formed with similarly shaped gullets, radially offset with respect to those in the outer zone, and with their outer ends overlapping the line of the inner edge of the outer zone so as to define replacement teeth on the inner zone with leading edges disposed at the same angle as those of the outer zone.

Referring to the accompanying drawings which show what is now considered a preferred embodiment of the invention:

Fig. 1 is a side view of my improved stone saw;

Fig. 2 is a side view on an enlarged scale of one of the teeth segments;

Fig. 3 is an enlarged fragmentary section on the line 3—3 of Fig. 2;

Figure 5:
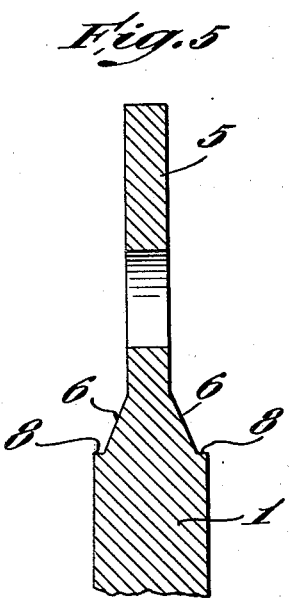
Fig. 5 is an enlarged fragmentary section through the outer peripheral section of the blade.
Figure 6:
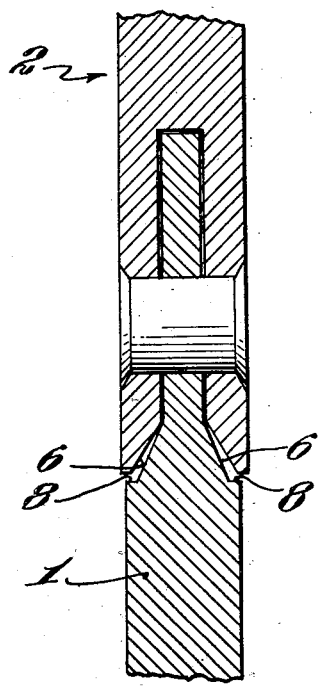
Fig. 6 is a section showing the parts in assembled relation before closing the gap.
Figure 7:
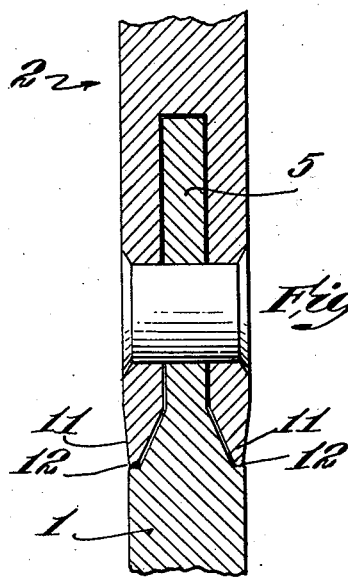
Fig. 7 is a section, similar to Fig. 6, but showing the gap closed.

The stone saw comprises a blade 1 preferably made of carbon steel or the like suitable material, and a plurality of detachable teeth segments 2 preferably made from a soft steel or the like suitable material and of somewhat greater thickness than that of the blade. The blade 1 is formed with a central opening, 4 to receive an arbor (not shown), and its outer periphery is formed with an annular flange or tongue 5, the base or inner portion being provided with outwardly flaring walls 6 which, with the side walls or faces of the blade, define a pair of relatively narrow annular shoulders 8, as shown in Figs. 5 to 7.

Figure 4:
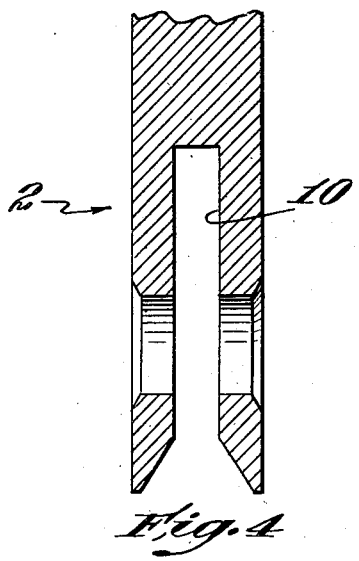
Fig. 4 is an enlarged fragmentary section through the inner peripheral portion of one of the segments.

Each of the segments 2 is formed with concentric inner and outer peripheries, the inner peripheral portion being formed with a groove 10 (Figs. 3 and 4), the walls of which are approximately complementary to those of the flange 5. The tapering free edges 11 (Figs. 3 and 6) of the groove portion 10 flare outwardly at a slightly greater angle than the wall 6, so that when the segments 2 are assembled with the blade 1, their edges 11 may be peened in or caulked against the shoulders 8 of the blade, as indicated at 12 in Fig. 7, thereby closing the gap so as to prevent shot, etc. from entering from between the parts. The inner peripheral portion of the segments and the flange 5 may be drilled or otherwise provided with openings to receive rivets 14 (Fig. 1) or other suitable attaching elements for securing the parts together.

The body portion of each of the segments 2 comprises inner and outer annular zones 15 and 16 of approximately the same radial dimensions (defined by the broken line $d$), the outer annular zone 15 being formed with circumferentially spaced elongate gullets 18 which extend in an approximately radial direction throughout the breadth of the zone so as to define cutting teeth each having a leading edge 20 extending at an angle $a$ of approximately 140° relative to the tangent passing through the point $p$ of intersection of the line $c$ of the leading edge 20 and the periphery of the tooth. The inner zone 16 is formed with similarly shaped gullets 21 which are radially off-set with respect to gullets 18 and which likewise extend approximately half the radial dimension of the segment with their outer ends overlapping the line $d$ of the inner edge of the outer zone, so as to define replacement teeth on the inner zone with leading edges 24 also extending at an angle of approximately 140°.

It will be noted that the arrangement of the gullets 21 on the inner zone is such that the teeth formed on the outer zone are integrally connected with the inner zone, by spaced areas adjoining the inner ends of their leading and trailing edges, and it has been found that with this construction and arrangement a greater angle of inclination of the saw teeth is permitted than heretofore possible without sacrificing rigidity of the individual teeth; and it has also been found that in operation, a better feeding of shot is afforded with faster cutting and at a reduced power consumption.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A stone saw comprising a circular blade having on its periphery an annular flange formed at its base portion with outwardly flaring side walls, the inner ends of which are spaced from the side walls of the blade so as to define a pair of relatively narrow annular shoulders, and a plurality of teeth segments mounted on said blade, each of said segments being formed at its inner periphery with a grooved portion having walls complementary to said flange, the inner free edges of said grooved portion being caulked against said annular shoulders to close the gap therebetween, the body portion of each segment being formed with a plurality of circumferentially spaced radially extending gullets defining saw teeth.

2. A stone saw comprising a circular blade having on its periphery an annular flange formed at its base portion with outwardly flaring side walls, the inner ends of which are spaced from the side walls of the blade so as to define a pair of relatively narrow annular shoulders, and a plurality of teeth segments mounted on said blade, each of said segments being formed at its inner periphery with a grooved portion having walls complementary to said flange, the inner free edges of said grooved portion being caulked against said annular shoulders to close the gap therebetween, the body portion of each segment being formed with a plurality of circumferentially spaced radially extending gullets defining saw teeth, each having leading edges extending at an angle of at least approximately 135° relative to a tangent passing through the point of intersection of the leading edge and outer periphery of the tooth.

WILLIAM MILNE.